United States Patent [19]

Brychta et al.

[11] 3,768,521

[45] Oct. 30, 1973

[54] LOGIC GATES

[76] Inventors: Ondrej Brychta; John Christopher Charnley, both of The Cranfield Institute of Technology, Cranfield, Bedfordshire, England

[22] Filed: May 26, 1971

[21] Appl. No.: 148,252

[30] Foreign Application Priority Data

May 26, 1970 Great Britain .................. 25,191/70
Nov. 13, 1970 Great Britain .................. 54,204/70

[52] U.S. Cl. .......................... 137/832, 235/201 ME
[51] Int. Cl. .............................................. F15c 3/04
[58] Field of Search .................................. 137/81.5; 235/201 ME

[56] References Cited

UNITED STATES PATENTS

| | | | |
|---|---|---|---|
| 3,593,734 | 7/1971 | Sanford | 137/81.5 |
| 3,682,189 | 8/1972 | Lapinas et al. | 137/81.5 |
| 3,540,477 | 11/1970 | Hogel | 235/201 ME |
| 3,326,239 | 6/1967 | Saint-Joanis et al. | 235/201 ME |
| 3,539,743 | 11/1970 | Winter | 137/81.5 X |
| 3,267,948 | 8/1966 | Groeber | 137/81.5 |
| 3,318,329 | 5/1967 | Norwood | 235/201 ME |
| 3,433,257 | 3/1969 | Jensen | 235/201 ME |
| 3,540,478 | 11/1970 | Ito | 235/201 ME |
| 3,559,945 | 2/1971 | Coiner et al. | 235/201 ME |
| 3,584,639 | 6/1971 | Potepalov et al. | 137/81.5 X |
| 3,605,807 | 9/1971 | Paschke | 235/201 ME |
| 3,612,085 | 10/1971 | Clark | 137/81.5 X |

*Primary Examiner*—Samuel Scott
*Attorney*—Nolte and Nolte

[57] ABSTRACT

The invention relates to the provision of a double function fluid logic gate, that is, a gate providing two output signal simultaneously, one a high-level $P_0$ signal and the other a low-level or $\overline{P}$ signal. The gate employs a plurality of SPDE (single path diaphragm element) units as the input stage of the gate, and a DPDE (double path diaphragm element) unit together with with an ejector system or wall attachment effect system, as the output stage. The output stage comprises two output channels; and the DPDE acts to switch an air stream of the air supply to or from an output channel so that when the logic of the gate is satisfied by the input signal condition, air at supply pressure is switched into one output channel to give the $P_0$ signal and air at supply pressure is switched from the other output channel to give the $\overline{P}$ signal therein. There are two modifications of the invention not employing SPDE units, namely, a flip-flop and a memory gate but both employ output systems as above described to provide the $P_0$ and $\overline{P}$ signals.

20 Claims, 31 Drawing Figures

LOGIC GATES

This invention relates to improvements in or relating to DE (diaphragm element) logic gates. More particularly this invention relates to logic gates comprising diaphragm elements combined with a fluid ejector or wall attachment effect elements, and to modular systems of such gates.

In general, diaphragm logic elements have very low power consumption allowing about 100 percent pressure recovery and hence virtually unlimited fan-out. The construction of diaphragm logic elements is comparatively simple and has low tolerance requirements. However, because a single input element can, normally have only a single output, the formation of gates and in particular, memory gates, is comparatively complicated; also the response is comparatively slow.

The present invention proposes to provide for DE logic gates providing a double function output, for instance, an OR/NOR output.

There is provided by the present invention a double function fluid logic gate comprising a plurality of SPDE (single path diaphragm element) switches interconnected to form the input stage faced the gate, and a fluid supplied, output system connected to the input stage of the gate to form the output stage thereof; the output system comprising two outputs in each of which a sream of fluid supplied at a steady pressure can be switched 78. an output channel to provide a high-level signal therein and then switched from the output channel to provide a low-level signal therein, and the output system being such that, in response to an input signal condition of the input stage which satisfies the logic function of the gate, a high-level signal (Po) is provided in a first of the outputs and a low-level ($\overline{P}$) signal in the second of the outputs.

Reference will now be made, by way of example, to the accompanying drawings in which the reference numerals indicate like parts and in which.

Figure 1:
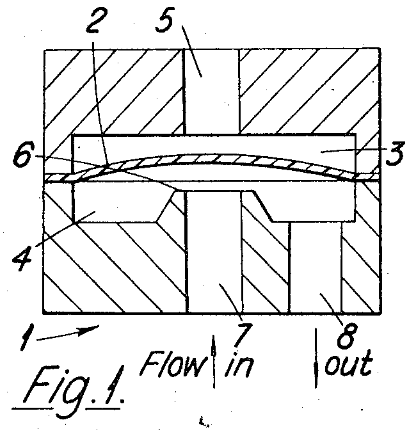
FIG. 1 is a section through a single-path diaphragm element in the present invention.

The Single Path Diaphragm Element 1 SPDE (FIG. 1) is a device with a single diaphragm 2 dividing hermetically the inner space of the element into two cavities, a signal cavity 3 and a flow path or vent cavity 4. A signal channel 5 enters the signal cavity 3. Opening into the vent cavity 4 is seat 6 of supply channel 7 and opening into the bottom of the vent cavity 4 is outlet channel 8. Functioning of the SPDE device: The supply channel 7 of the element 1 is connected to a source of air under pressure having an internal resistance (restrictor) and the outlet channel 8 opens to the ambient atmosphere through a vent restrictor. This arrangement will produce what is in effect a bias pressure in the vent cavity and there will be a flow of air through the cavity 15. On increasing the pressure in the signal cavity 3 to slightly over the value of the bias pressure, snap switching of the diaphragm 2 onto the seat 6 will follow, resulting in the reducing and stopping of the flow through the vent cavity 4 during its movement against the seat 6 and its eventual closing of the orifice, On decreasing the pressure in the signal ciavity 3 to less than the value of the bias pressure, until the force acting on the diaphragm from the other side is equalled and then exceeded, snap switching of the diaphrgam 2 from the seat 6 will follow, allowing the flow to continue and thus building up the bias pressure.

Figure 2:
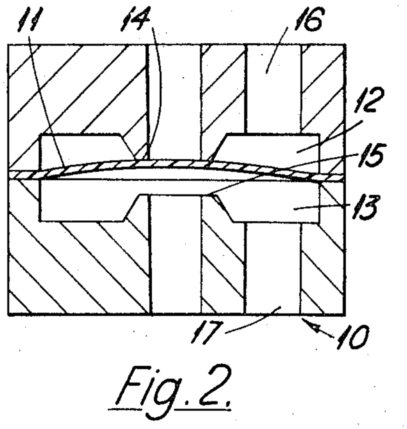
FIG. 2 is a section through a double-path diaphragm element employed in the present invention.

The double path diaphragm element 10 (DPDE) FIG. 2 is a modified form of the single path diaphragm element, having two separated flow paths controlled by the single diaphragm. The design of the DPDE can be seen in FIG. 2. Diaphragem 11 divides the inner space of the element 10 into two similar cavities 12, 13 each having in the centre of the cavity a seat 14, 15 and side holes 16, 17 which form the outlet of the respective cavity. Either the bias pressure in the upper cavity 12 controls the flow through the lower cavity 13 or the bias pressure in the lower cavity 13 controls the flow in the upper cavity 12 by closing, say, the lower seat 15 or by closing the upper seat 14 respectively with the diaphragm 3. It will be understood that in the DPDE device either cavity may also act as a signal cavity.

The Logic Function Creation: Various interconnections of the single path diaphragm elements give various logic functions. By a series interconnection of the SPDE units (see FIG. 9), an OR logic function can be effected; and by means of a parallel interconnection of SPDE units (see FIG. 10) an AND logic function can be effected; the interconnected units forming the input stage of the gate.

A bistable Diaphragm-Ejector Amplifier using cylindrical ejectors, may be employed as the output stage of the gate for digital transmission of the pressure signal.

Figure 6:
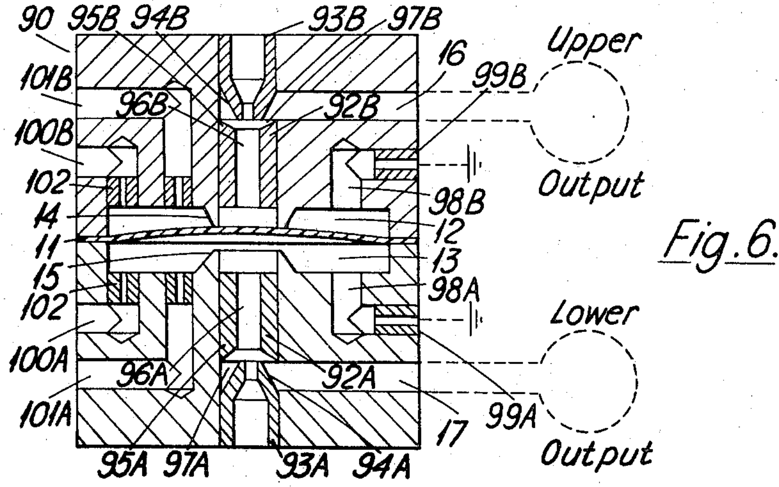
FIG. 6 is a section through a bistable diaphragm ejector amplifier which may be employed in the present invention which develops the principle of the device of FIG. 3 to provide a two-output device.

The output system is based on the Bistable Diaphragm Ejector Amplifier 90 as illustrated in FIG. 6.

Figure 3:
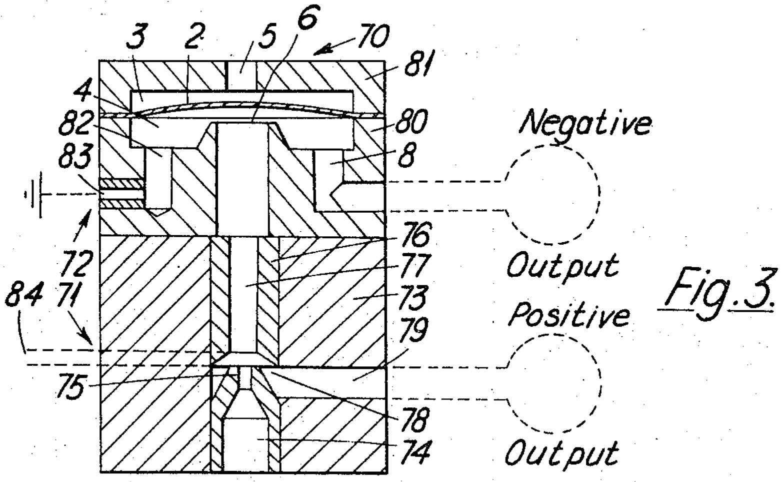
FIG. 3 is a section through a monostable diaphragm ejector illustrating the use of a cylindrical ejector as a form of output signal device.

Basically a (monostable) Diaphragm-Ejector Amplifier 70 (FIG. 3) consists of an air supplied cylindrical ejector as indicated at 71 and a single path diaphragm element (SPDE) as indicated at 72.

The supply manifold is composed of a manifold body 73, in which is located a cylindrical nozzle body 74 and nozzle 75 on the centre line of a conically faced generally cylindrical receiver 76 having a central duct or receiving chamber 77. Between the outlet of the nozzle 75 and inlet of the concentric body 74 is a gap 84 no greater than one diameter of the nozzle and which forms the ejector chamber 78. In the manifold body 1 is an outlet channel 79, which leads from the ejector chamber 78 and from whence is taken the positive output.

The SPDE 72 is composed of a body 80 which contains the vent cavity 4 and cover 81 which contains the signal cavity 3. The diaphragm 2 hermetically divides the vent cavity 4 from the signal cavity 3. The gap between the face of seat 6 and the surface of the diaphragm 2 can range from zero to one quarter of the nozzle diameter. The diaphragm 2 is made from a flexible material such as thermoplastic or rubber-covered silk. The mounting of the diaphragm 2 between the covering 8 and the body 80 does not tension the diaphragm, so that the movement of the diaphragm 2 against the seat 6 does not produce any force in the diaphragm 2.

In the centre of the vent cavity 4 is located the seat 6, and in the body of the amplifier is a vent hole 82 which connects the vent cavity 4 with the ambient atmosphere through the vent restrictor 83. Channel 8 forms the outlet of the negative output signal of the diaphragm-ejector amplifier. In the cover 8 of the amplifier is the signal channel 5 for the input signal.

Functioning of the Monostable Diaphragm-Ejector Amplifier

The nozzle 75 of the amplifier is connected to a source of steady pressure and the outlet channels 8 and 79 are connected to the dead head volume.

The diaphragm 2 is biased by the pressure in the vent cavity 4, the magnitude of which is proportional to the squared ratio of the nozzle to the vent restrictor cross-sectional flow areas. This pressure exists in the vent cavity 4 and in the dead head volume connected thereto by the channel 8.

In the dead head volume connected by the outlet channel 79 is a pressure determined by the injector effect of the stream at the nozzle 75. The pressure difference between the vent cavity pressure and the pressure in the outlet channel 79 is given by the design parameters - diameter and length of the concentric hole in the receiver 76, the shape and the diameter of the nozzle 75 and the gap between the nozzle 75 outlet and the receiver 76.

Figures 4, 5, 7, 8:
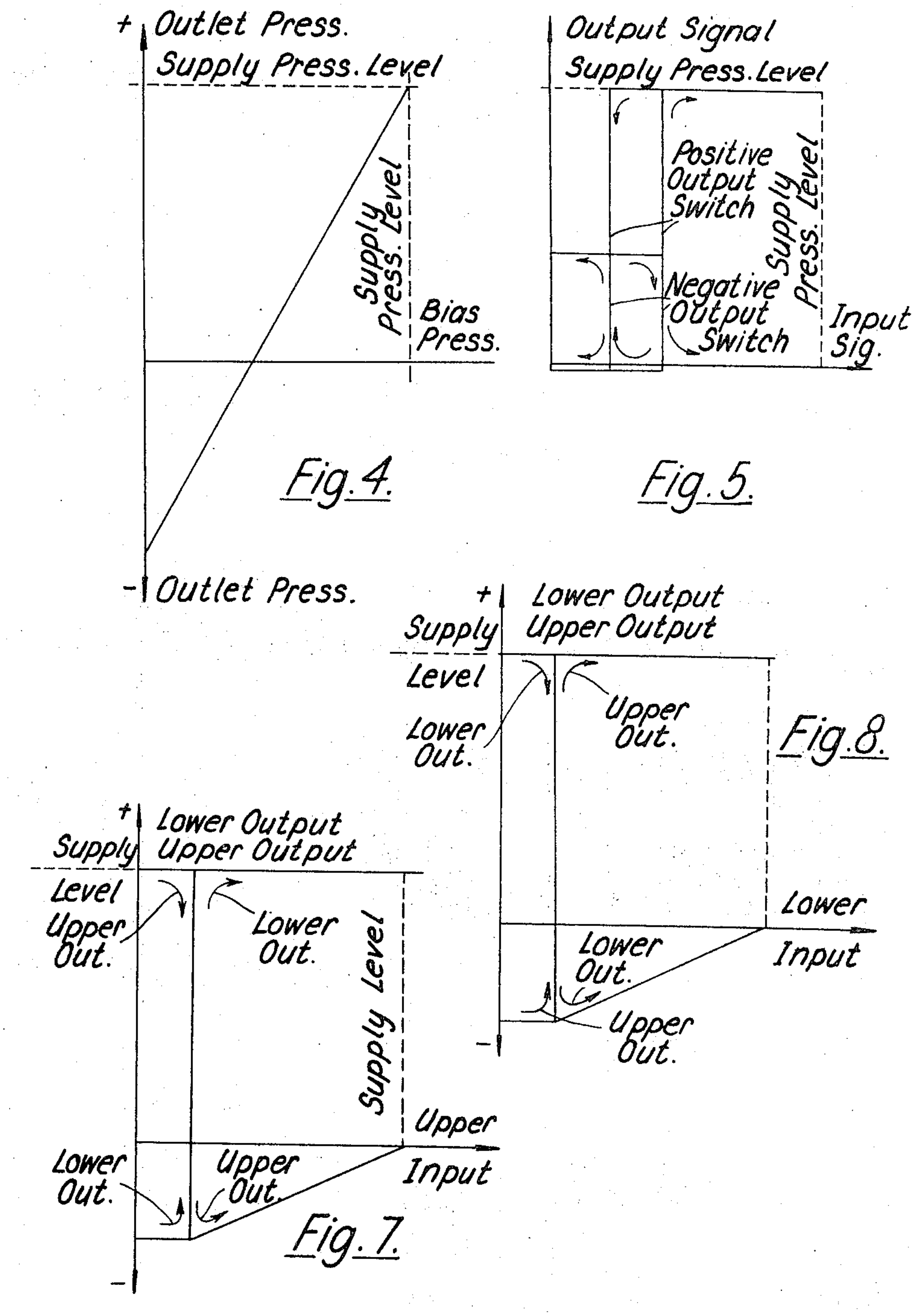
FIG. 4 shows the flow characteristics of the outlet pressure of the unit of FIG. 3.
FIG. 5 shows the switching characteristics of the unit of FIG. 3.
FIGS. 7 and 8 show the switching characteristics of the unit of FIG. 6.

When using the amplifier for digital operation, a pressure difference of zero or slightly below ambient pressure level in the outlet channel 79 is important so that the "zero" output signal can be clearly represented. Under this condition, by optimising the geometry of the receiver and nozzle a pressure difference of 25 percent to 35 percent of the supply pressure can be achieved. The relationship between the pressure in the outlet channel 79 and the bias pressure is shown in FIG. 4.

In operation, the pressure in the signal channel is continuously counteracted. If the pressure in the signal caivty 3 is less than the bias pressure in the vent cavity 4, the diaphragm 2 does not move because the resultant forc acting on the surface of the diaphragm 2 pushes the diaphragm into the signal caivty.

If the pressure in the signal cavity 3 slightly exceeds the value of the pressure in the vent cavity 4, the diaphragm begins to move towards the seat 6 at an initial acceleration proportional to the initial pressure difference between the signal pressure and the bias pressure in the vent cavity 4. The value of the acceleration is function of the effective area of the diaphragm 2. As the diaphragm 2 moves towards the seat, the initial gap between the diaphragm 2 and the seat 6 becomes smaller, throttling the flow through the seat 6 into the vent cavity 4. As the vent cavity 4 is interconnected with the ambient atmosphere through vent restrictor 83, the biassing pressure in the vent cavity 4 falls and the pressure difference between the signal and the bias pressure rises, producing a greater acceleration of the diaphragm 2. The movement of the diaphragm 2 is stopped by the seat 6, thus closing the gap. In this position of the diaphragm 2, the pressure in the vent cavity 4 becomes equal (through the vent restrictor 83) with the ambient atmosphere, and the pressure in the outlet channel 79 and interconnected dead head volume becomes the value of the supply pressure. Thus, an input signal, of pressure level equal to the bias pressure in the vent cavity 4 produces a positive output in the outlet channel 79 equal to the supply pressure and a negative output in the interconnecting output channel 8 equal to the ambient atmosphere pressure. The switching gain of the positive output — the ratio of the output pressure level divided by the bias pressure — is given by the pressure difference caused by the injector system. The switching gain of the negative output always has a value of one.

The stability of the diaphragm 2 when closing the seat 6 is ensured by the force acting in the signal cavity 3 on the surface of the diaphragm 2. The product of the signal pressure and the effective area of the diaphragm should be greater than the product of the supply pressure and the effective area of the seat 6. If this difference in forces does not exceed a limiting value thereby keeping the pressure signal level near to the bias pressure, oscillations of the diaphragm 2 will occur, thus causing oscillations of the positive and negative output pressures. The frequency of these oscillations will depend on the volume of the load attached to the positive output and will also be inversely proportional to the supply pressure. The effect could be utilised in the design of an oscillator.

Assuming stable switching characteristics with increasing input pressure, the hysteresis of the switching characteristic on decreasing the input pressure is approximately given by the resultant of the forces acting on the diaphragm 2 when closing the seat 6. Decreasing the input pressure from a value of greater than or equal to the bias pressure, causes the diaphragm 2 to lift away from the seat 6. Increasing acceleration of diaphragm lift follows because of the increasing force acting on the diaphragm 2 in the vent cavity 4. This lifting force is a product of the increasing pressure in the vent cavity 4 and the effective area of the diaphragm 2 which, combined with the "snap" effect of the diaphragm, instigates lift. The resulting gap between the seat 6 and diaphragm 2 is allowed by the free movement of the diaphragm 2; the negative output becomes the full bias pressure, and the output pressure on the positive output 79 falls to the value given by the extractor effect of the nozzle 75.

The monostable diaphragm amplifier performs two basic functions, positive and the negative logic function and snap-action diaphragm switching, producing the relay pressure input-output characteristic shown in FIG. 5.

BISTABLE AMPLIFIER

The bistable Diaphragm-Injector Amplifier 90, as shown in FIG. 6, is composed of two symmetrical parts divided by the diaphragm 11 and comprising a lower body, and an upper body respectively, having the same-sized lower cavity 13 and upper cavity 12 respectively. In the centre of each cavity is a seat, viz lower seat 15 and upper seat 14. Each channel of the seats 15 and 14 leads to the ejector system, which is composed of lower receiver body 92A with supply nozzle body 93A and upper receiver body 92B with supply nozzle body 93B. Lower nozzle 94A and upper nozzle 94B are respectively located in the centre line of conically shaped lower intake 95A and of conically shaped upper intake 95B. The conically shaped intakes 95A, 95B lead into lower chamber 96A and into upper chamber 96B respectively, which are concentric with the centre lines of the nozzle 94A, 94B. Between the outlet of each nozzle 94A, 94B and the inlet to the respective receivers 93A, 93B are gaps which form the lower ejector chamber 97A and the upper ejector chamber 97B. The lower ejector chamber 97A leads to the lower output channel 17 and the upper ejector chamber 97B leads to the upper output channel 16. The lower cavity 13 is connected with the ambient atmosphere by lower vent hole 98A through the vent restrictor 99A. The upper cavity 12 is connected with the ambient atmosphere by upper vent hole 98B through the upper vent restrictor 99B. The lower and the upper cavities 13 and 12 are each connected to two signal channels viz: the first and second lower channels 100A and 101A and the first and second upper channels 110B and 101B respectively. In each signal channel is a signal restrictor 102.

Functioning of the bistable Amplifier: The nozzles 94A, 94B of the amplifier are connected to a source of air at steady pressure; the lower and upper output channels 16, 17 are connected to the dead head volumes.

The signal channels are connected to zero level pressure or with the ambient atmosphere. The diaphragm under these conditions will seal either the lower seat 15 or the upper seat 14, and will stay in this position, with the seat closed. Assuming that the diaphragm 11 is closing the lower seat 15, the stable position is maintained by the biassing pressure on the effective area of the diaphragm 11 in the upper cavity 12.

The biassing pressure in the upper cavity 12 is determined by the effect of the upper vent restrictor 99B and the input restrictors 102 so that the force keeping the seat closed is greater than the force acting on the diaphragm 11 from the closed seat 15. The pressure in the lower cavity 13 is equal to the ambient atmospheric pressure. In the lower output channel 17 and the interconnected dead head volume, the pressure level is that of the supply pressure. The upper output channel 16 and interconnected dead head volume is at the ambient atmospheric pressure, as shown on the static ejector characteristic shown in FIGS. 7 and 8. FIG. 7 shows the characteristic when the diaphragm 11 switches from the lower seat 15 to the upper seat 14 and FIG. 8 shows the characteristic when the diaphragm 11 switches from the upper seat 14 to the lower seat 15.

The input pressure signal is applied into the upper first or second or both of the upper input channels 100B, 101B. The pressure in the upper cavity 12 is a function of the combined flow from the input restrictors 108 and from the nozzle 94B therein increasing the output pressure level in the upper output channel 16. If the pressure in the upper cavity 12 is not more than about 30 percent to 40 percent of the supply pressure, the output pressure on the upper output channel 16 will not exceed the ambient pressure and the output pressure of the bottom output 17 does not change.

If the input pressure signal is applied to the bottom first or second or both of the bottom input channels 100A, 101A whilst the input signal is applied into the upper first or second or both of the upper input channels 100B, 101B, the state of the outputs of the amplifier will not change because of the bigger pressure in the upper cavity 12 due to the bias pressure on the whole of the area of the diaphragm 11.

If the input pressure signal is applied to the first or second or both of the bottom input channels 100A, 101A whilst there are no input signals in the first or second upper input channels 100B, 101B, the pressure in the bottom cavity 13 results from the input flow through the input restrictor or restrictors 102 and the out flow through the bottom vent restrictor 99B. If the pressure in the bottom cavity 13 approaches the bias pressure level in the upper cavity 12, switching of the diaphragm 11 will follow. The diaphragm will then be accelerated from the bottom seat 15 towards the upper seat 14 because of the flow from the bottom nozzle and from the injected flow from dead head volume of the bottom chamber 17, and because of the decreasing bias force in the upper cavity 12. The diaphragm 11 switches over witha snap effect, thus providing the input-output pressure switching relay characteristic shown in FIG. 8.

Figure 13:
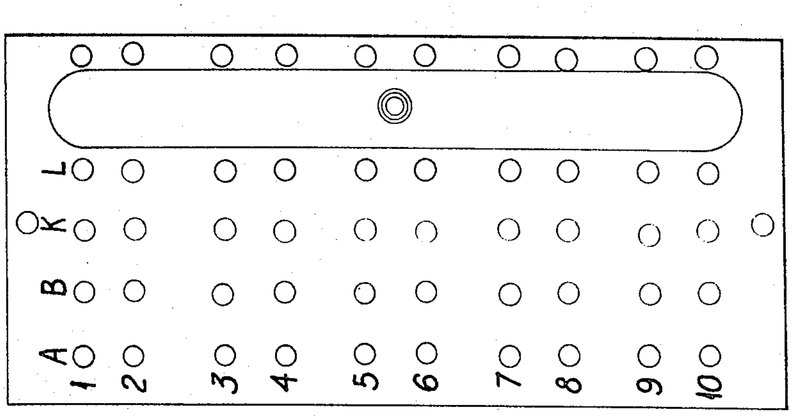
FIGS. 11, 12 and 13 are top, side and bottom views respectively of a multi-function logic module which may be employed in the embodiment of FIGS. 9 and 10.
Figure 12:
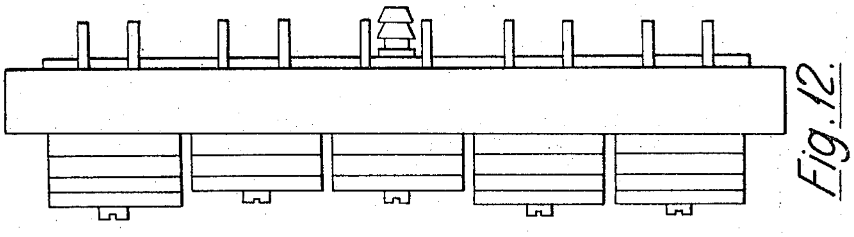

The design of the Logic System: A logic system using the diaphragm-ejector amplifier may be composed using a supply manifold assembly with various logic gates (OR/NOR: AND/NAND; for instance). The various gates are formed in one side of the manifold and on the opposite side of the supply manifold are the input and the output connectors of the logic gates. The isolation between the supply manifold and the gates is by O-ring seals. An example of the system can be seen in FIGS. 9, 10 and 11, and in FIGS. 11, 12 and 13.

Inside supply manifold body 110 is placed a number of output systems (each providing two outputs) equal to the number of the gates which can be attached to the manifold. Each output system comprises two cylindrical ejectors A, B and an associated DPDE unit, the ejectors being fed from a supply cavity 111, via a common channel in the manifold body 110 from which all the gates are supplied and to which air is supplied through one of two supply connectors (not shown) from a source of steady pressure.

Each ejector system comprises supply nozzle body 74A, and 74B and receiver body 76A, 76B having a conical intake and cylindrical duct 77A, 77B forming the ejector mixing chamber. The length-to-duct diameter ratio has a minimum value of 4. The nozzle body 74A, 74B and the receiver body 76A, 76B are a pressfit in the holes in the manifold body 110. This arrangement provides sufficient accuracy of concentricity of the nozzle and the ejector mixing chamber. Between the nozzle outlet and the edge of the cylindrical duct 77A, 77B is a gap with a minimum length of one nozzle diameter which forms injection chamber 78A, 78B. A radial duct 114A, 114B in the manifold body 110 connects the ejector chamber 78A, 78B with output connector 79A, 79B.

Three holes 116 passing through the manifold body 110, for passage of input signals to the gate, constructed in each section, together with the output system and connectors 117 in the manifold body, form the connections to the gate; all the connections being made on the exterior face of the manifold plate. On the inside face of the manifold body 110, are formed counterbores 118 for rubber O-ring seals 119.

The gate is assembled in a sandwich construction of several plates, held together by screws or rivets 120, and rigidly attached to a base plate formed of signal cavity plate 24. For good space exploitation, plates can be used in which two gates are formed side by side.

Figure 9:
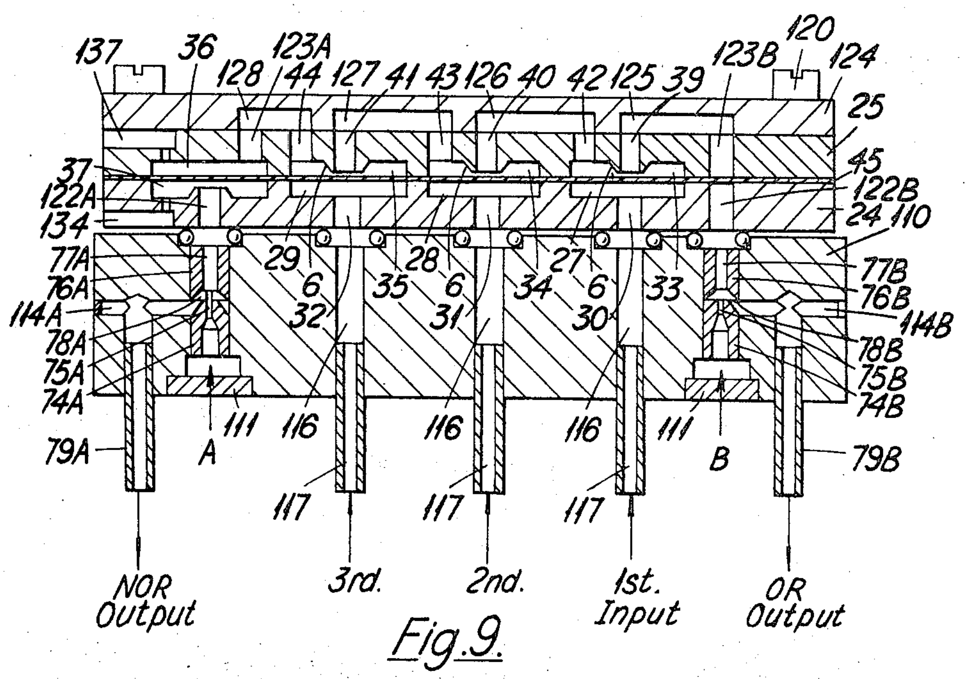
FIG. 9 is a section through a modular three-input OR-NOR gate and supply manifold according to the present invention.
Figure 10:
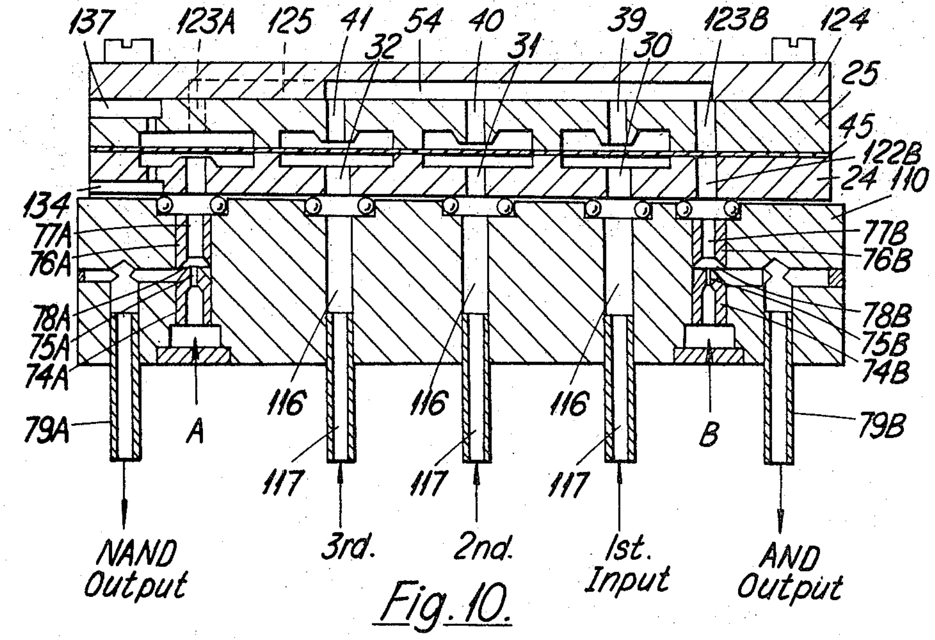
FIG. 10 is a section through a modular three-input AND-NAND gate and supply manifold according to the present invention.
Figure 11:
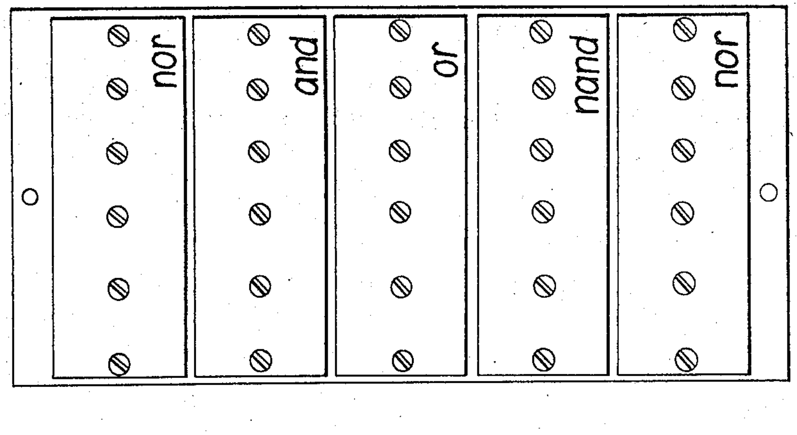

The gates shown in FIGS. 9 and 10 are 3-input double function gates, namely an OR/NOR gate and an AND/NAND gate respectively. Although it is not apparent from the drawings, each gate is provided in duplicate; and each two input stages are formed in an assembly of three plates. In the case of the OR/NOR gates in the base plate 24 are formed in respect of each of the side-by-side gates, signal cavities 27, 28 and 29 in the centre of each of which is input channel 30, 31 and 32 respectively, connecting the signal cavity with the input signal connectors 117 formed in the supply manifold 110. Hole 122 connects the gate with the supply ejector system in the supply manifold 110. On the centre line of the base plate 24 are four tapped holes for screws 120 holding the plates together. Between the base plate 24 and a second plate forming vent cavity plate 25, is diaphragm 45 made from a sheet of thin plastics or rubber-coated silk or nylon and contiguous with the base plate 24. Vent cavities 33, 34 and 35 of the elements are formed in the second plate 25, and seats 6 are located in the centre of the vent cavities 3. Inside the seats, holes 39, 40 and 41 pass through the second plate 25 to its outer surface. In each vent cavity is a vent hole 42, 43 and 44 connecting the vent cavities with the outer surface of the plate. Another supply hole 123B connecting the supply hole 122B in the base plate 24 with the outer surface of second plate 25 is furnished in the second plate 25 in a corresponding position. In the inner surface of third plate 124 is a supply channel 125, connecting the outlet of the supply hole 123B with the inlet 39 of the first vent cavity. In the inner surface of the third plate 124 the interconnecting channels 126, 127 and 128 connect the vent hole of the vent cavity 33, 34 and 35, with the next hole 40, 41, 123A in the line; the hole 123A being the input of the vent chamber 36 of the bistable amplifier, the other vent chamber 37 of which is connected to the cylindrical ejector by a hole 122A formed in plate 24; and the vent chamber of the amplifier being vented through restrictors 137 and 134 respectively.

In operation of the gate, when any input signal is present, the air supply to ejector B is passed through outlet channel 114B giving the OR (Po) output signal whereas, because the diaphragm of the DPDE is moved upwardly under supply pressure the supply to ejector A is vented through vent chamber 37, to provide the low level or NOR ($\bar{P}$) output signal. When, the input signal is or input signals are removed, the outputs switch by venting of the supply to ejector B through chamber 36 of the DPDE device, and passage of the supply to ejector A through output channel 114A due to downward movement of the diaphragm of the DPDE device.

The AND-NAND gate of FIG. 10 has a similar construction excpet that plate 124 provides a channel 54 connecting channels 39, 40, 41 of the input stage, and has the channel 125 formed to connect all the vent channels 42, 43, 44 to the channel 122A of the amplifier. The gate also operates in a similar manner to the OR/NOR gate except that since the SPDE units are connected in parallel, all the input signals must be present to provide the AND and NAND outputs while only one input signal needs to be removed, the remove those outputs.

Because of low supply pressure requirements (500–1,000 mmw.) and relatively small supply nozzle and restrictor areas, the power consumption is low relative to other digital fluidic systems.

As the signal cavities are non-vented 100 percent pressure recovery on the outputs of the gates is generated, while the large fanout facilitates the realisation of the complicated networks. The four input gates reduce the number of required gates in the network, and the possibility of the element cavity diameter miniaturisation ensures good space exploitation.

The relatively fast response and the simple creation of the memory gates are the main advantages of the non-moving parts system. i.e., those using planar ejector or wall attachement principles. The limited fan out, the low pressure recovery, relatively big flow requirements and high tolerance problems are the main disadvantages of these systems.

Figure 14:
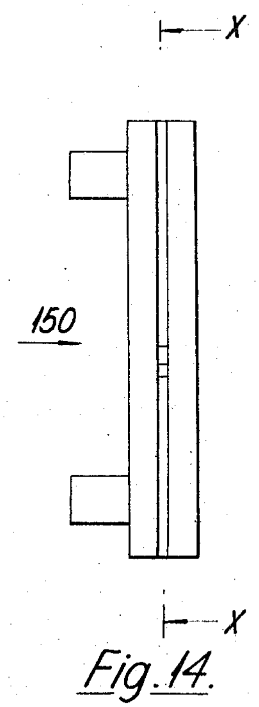
FIG. 14 is a side view of a planar injector element which may be employed in the present invention.
Figure 15:
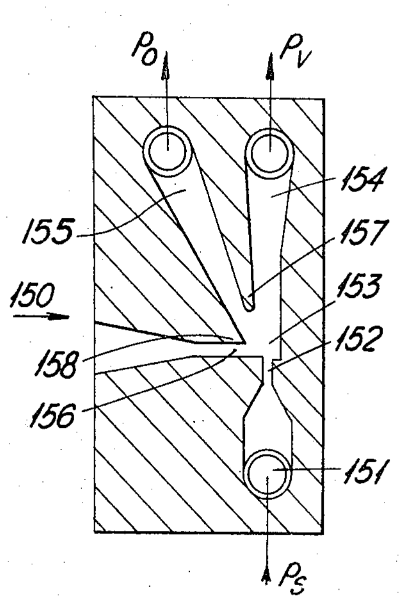
FIG. 15 is a section along the plane X—X of FIG. 14.

The ejector 150 (FIGS. 14, 15) is a PE (planar ejector) device, supplied by the planar nozzle 151 of aspect ratio equal to one or more. The outlet 152 of nozzle 151 enters interaction space 153, inside the element, which is formed by the junction of three planar channels: supply channel 154, the output channel 155 and vent channel 156. The outside wall of the supply 154 is offset from the nozzle output 152. The inner side walls of the supply channel 154 and the output channel 155 form the splitter 157 dividing the supply channel 154 from the output channel 155. The output channel 155 is inclined with respect to the nozzle 152 centre line The vent channel 156 enters the interaction space 153 from the same side as the output channel 155. A wall of the vent channel 156 with the outside wall of the output channel 155 forms an edge 158 located in the offside position with respect to the nozzle outlet 152. The vent channel 156 width opening into the interaction space 153 is not bigger than the supply nozzle 154 width.

Figure 16:
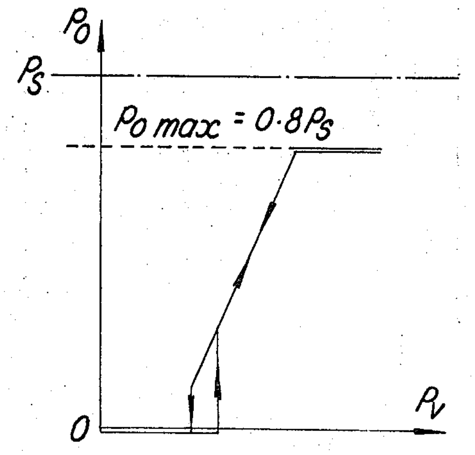
FIG. 16 shows the switching characteristics of the element of FIGS. 14 and 15.

The functioning of the planar ejector 150: The device is supplied by the nozzle 151 from a steady source of air under pressure, and the output channel 155 is connected to the dead head volume. The entrained flow from the vent channel 156 caused by Bernoulli effect urges the stream in the interaction space 153 onto the outside wall of the supply channel 154; thus the air flows through the supply channel 154 and eventually out of the ambient atmosphere, and no air enters into the output channel 155. On throttling the flow from the outlet of the supply channel 154, the static pressure ($P_v$) in the channel 154 rises (as shown in FIG. 16) and the output pressure in the dead head volume remains unchanged. As the pressure in the outlet of the supply channel 154 reaches a certain critical value (0.2 $P_s$ – 0.3$P_s$), the stream from the supply nozzle 152 switches into the output channel 155 and a sudden steep rise of pressure occurs in the dead head volume interconnected with the output channel 155. If the outlet of the supply channel 154 is closed, the pressure in the output channel 155 and in the connected dead head volume will reach a level of (0.7 – 0.8)$P_s$ and there will be a slightly lower pressure in the supply channel 154 because the pressure dividing effect of the vent channel 156 decreases pressure inside the element. Opening the outlet of the supply channel 154 results in a proportional decrease in pressure at the output channel 155. At certain values of the pressure (0.1 – 0.2)$P_s$ in the supply channel 154, the switching of flow into the supply channel 154 will occur producing the hysteresis loop of the static pressure characteristic of this device.

Figure 17:
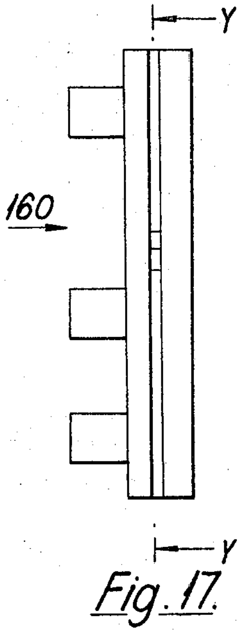
FIG. 17 is a side view of a monostable wall-attachment amplifier which may be employed in the present invention.
Figure 18:
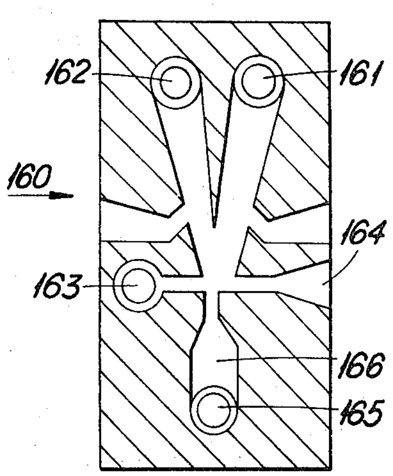
FIG. 18 is a section along the plane Y—Y of FIG. 17.

The Monostable Wall Attachment Amplifier (MWAA) 160 (FIGS. 17 and 18) is an output vented monostable wall-attachment effect device having a positive and a negative output 161 and 162 respectively and one input 163. On the opposite side of the input channel 163 is the vent channel 164 connecting the MWAA with the ambient atmosphere. Supply inlet 165 opens into interaction space 166.

Figure 19:
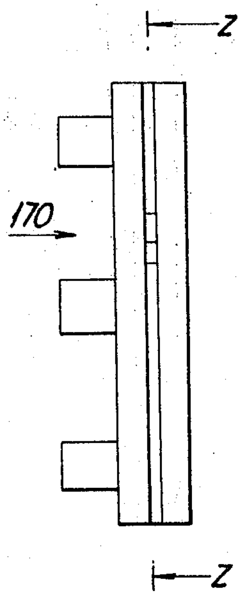
FIG. 19 is a side view of a bistable wall-attachment amplifier which may be employed in the present invention.
Figure 20:
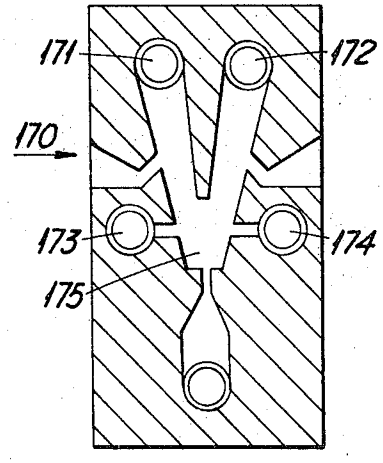
FIG. 20 is a section along the line Z—Z of FIG. 19.

The Bistable Wall Attachment Amplifier (BWAA) 170 (FIGS. 19 and 20) is an output vented bistable wall-attachment effect device having two outputs 171, 172 and two inputs 173, 174, one of each on each side of the interaction space 175 so that the attached flow on one wall causes positive pressure in the respective input channel and zero or negative pressure on the opposite input channel.

Figure 21:
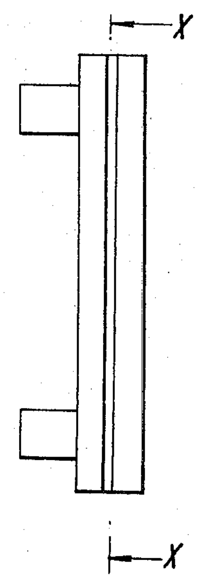
FIG. 21 is a side view of a non-vented planar ejector element which may be employed in the present invention.
Figure 22:
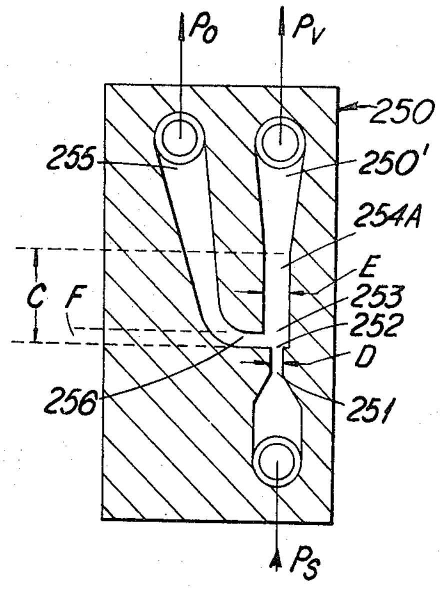
FIG. 22 is a section along the plane X—X of FIG. 21.
Figure 23:
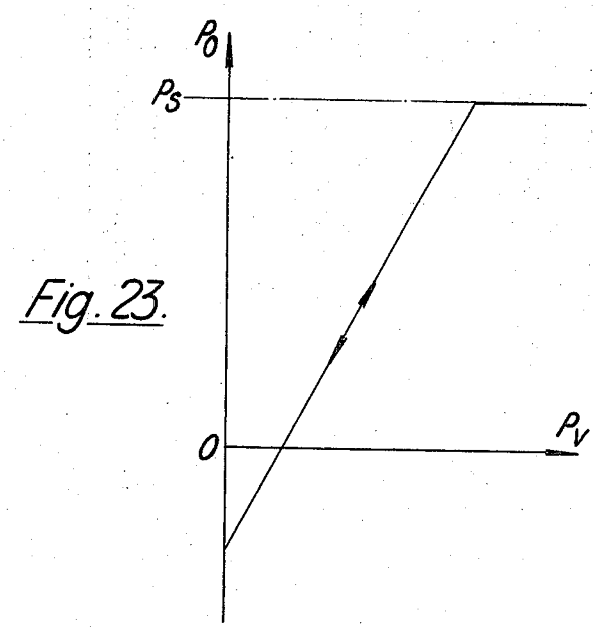
FIG. 23 shows the switching characteristics of the element of FIGS. 21 and 22.

The non-vented planar ejector 250 (see FIGS. 21 and 22) is similar to the PE 150 (FIG. 15) except that there is no vent channel. Thus, the nozzle 251 leads to the interaction space 253 via outlet 252 of width D. Ejector 250' leads from the space 253 via a duct 254A of width E and length C. Output channel 255 leads from the space 253 via channel 256 of width F which enters the space 253 at right angles to the length of the channels 254A and 252. As can be seen from FIG. 23, when fluid flows out from channel 251 to channel 250', the Bernoulli effect causes a negative pressure in channel 255 which decreases as flow through channel 254 is stemmed until the whole output switches to channel 255. Preferably F and D are equal, E is 2 – 2.5 times D and C is 10 – 10.5 times D.

The PE or the wall-attachment effect elements may be used as output stages for logic gates using SPDE units as the input stages. The examples described below comprise a first system using the PE 150 (FIGS. 14 and 15) in combination with the Single Path Diaphragm Elements - SPDE (FIG. 1) and with the Double Path Diaphragm Element, - DPDE 10 (FIG. 2). It will be seen that this first system is analogous to the gates above described, the latter using cylindrical ejectors with a DPDE unit to form the outputs whereas the first system employs planar ejectors in combination with a DPDE unit. The second system is based on the MWAA 160 (FIG. 18) and BWAA 170 (FIG. 20) and the diaphragm elements (SPDE 1 and DPDE 10). The diaphragm elements may be employed in the modular form described above.

Figure 24:
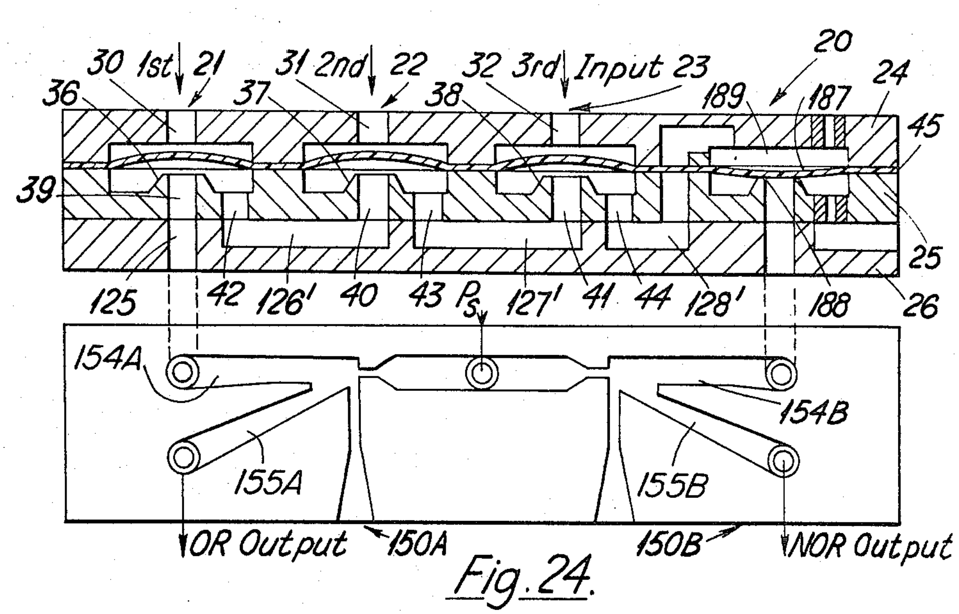
FIG. 24 shows a 3-input OR-NOR gate according to the present invention.

An example of a three input logic OR-NOR gate according to the first system can be seen in FIG. 24. The gate comprises two PE units 150A, 150B and three OR coupled SPDE units (generally indicated at 21, 22 and 23) with a DPDE unit generally indicated at 20. The supply input channel 39 of the first SPDE unit is connected by a channel 125 to the supply channel 154A of unit 150A while the vent channel 44 of the third SPDE unit is connected to the input orifice of vent chamber 189 of the DPDE unit, the other vent chamber of which is connected to the supply channel 154B of the PE unit 150B. If no input signal is applied, the bias pressure in chamber 189 keeps the diaphragm 187 of the DPDE output unit 20 on its seat 188 so that there is a high-level signal from the output of unit 150B and a low-level signal from the output of unit 150A. If any of the three input signals are applied to the input signals channels 30, 31 and 32, the bias pressure in the signal cavity 189 of the output DPDE unit drops, the diaphragm 187 is pushed off its seat 188, the stream in the second PE unit 150B switches into the supply channel 154B so that the output of unit 150B becomes zero (the NOR or $\bar{P}$ output signal), while the output at about 0.7 $P_s$ (the OR or Po signal), is instigated at the output of unit 150A.

Figure 25:
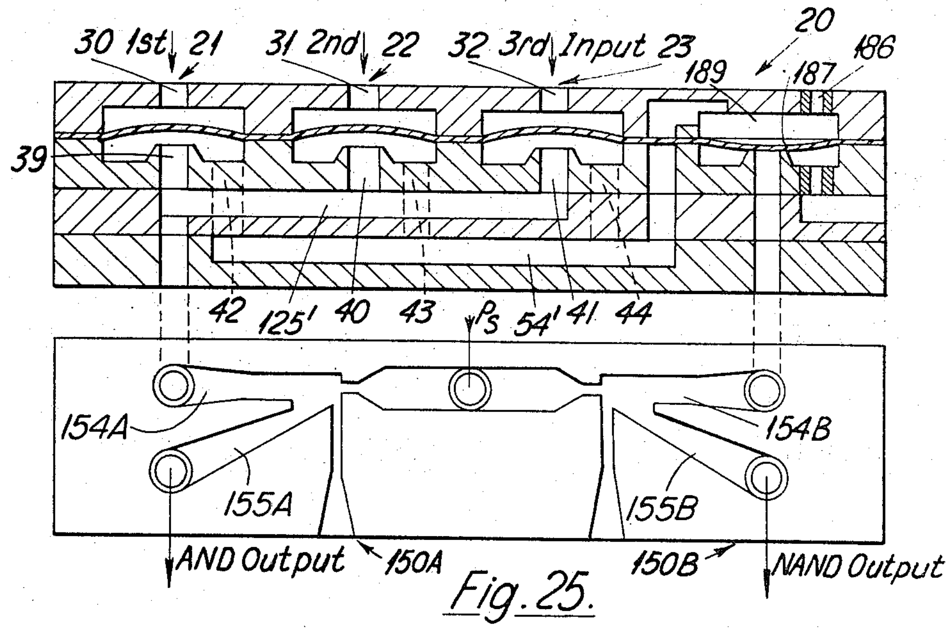
FIG. 25 shows a 3-input AND-NAND gate according to the present invention.

An example of a three input AND-NAND logic gate can be seen in FIG. 25. The gate is exactly similar to the OR/NOR gate of 24 except that the SPDE units are AND coupled by means of channels 54' and 125'. Consequently if only one or two of the three input signals is or are applied to the signal input channels 30, 31, and 32, the bias pressure in the signal cavity 189 of the DPDE 20 is maintained thereby keeping the seat 188 of the unit 10 closed so that there is a high-level signal in the output channel of unit 150B and a low-level signal in the output channel of unit 150A. If all the input signals are applied, the bias pressure in the cavity 189 of the output DPDE unit drops, unsealing the seat 188, the stream in the second PE 150B switches into the supply channel 154B so that the NAND output is produced in the output channel thereof while the AND output (at about 0.7 $P_s$) is instigated in the output channel of the PE unit 150A.

Figure 26:
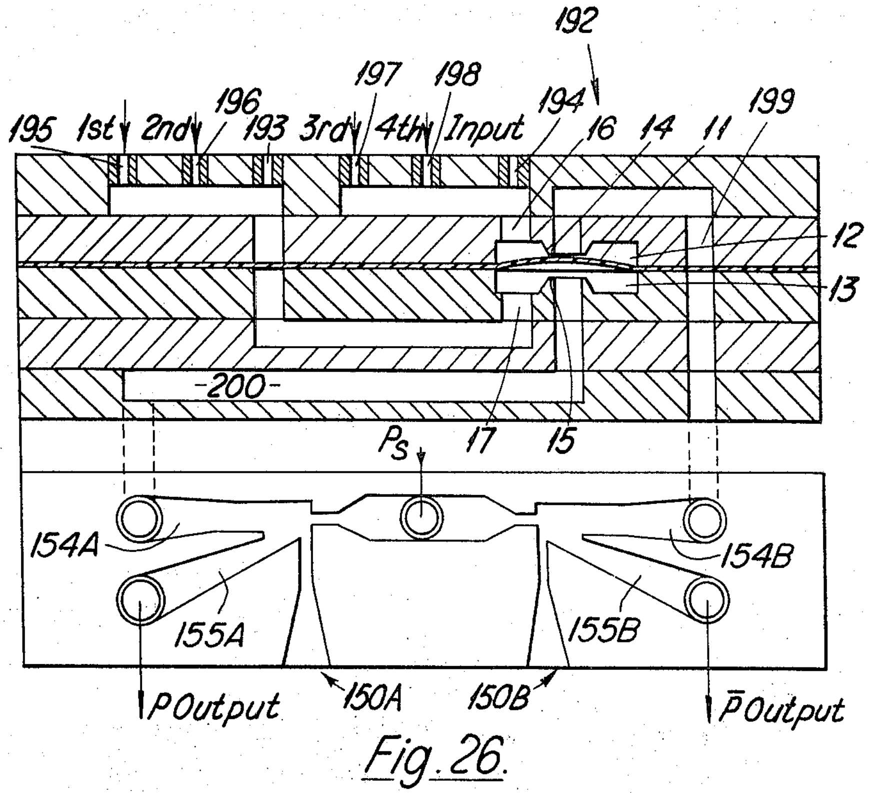
FIG. 26 shows a 4-input flip-flop gate according to the present invention.

By using two PE units 150A, 150B coupled together with a DPDE 10, a flip-flop gate 192 with four inputs can be formed (FIG. 26). In this embodiment of the present invention, each of the supply channels 199, 200 of the DPDE 10 is supplied through one of the PE units. Each outlet 16, 17 of the DPDE unit is connected with one vent restrictor 193 or 194 and with two other input restrictors 195 and 196 or 197 and 198. The diaphragm 11 can have only the two stable positions, determined by the presence of the bias pressure either in the upper path cavity 12 or in the lower cavity 13 thus either closing the bottom seat 15 and opening the upper seat 14 or closing the upper seat 14 and opening the bottom seat 15. If the upper seat 14 is closed, the $\overline{P}_o$ output channel of the PE 150 is at the high level while $P_o$ channel is at the low-level; if the bottom seat 15 is closed, the $\overline{P}_o$ out-put, however, becomes zero and the $P_o$ output of PE assumes the high level. The input signal magnitude required for switching the diaphragm 11 either from the upper seat 14 to the bottom seat 15 or from the bottom seat 15 to the upper seat 14 is the magnitude of the bias pressure either in the lower cavity 13 or in the upper cavity 12. Because of the stable position of the diaphragm 11 closing the seats 14, 15, is due to the arbitrary protuberance of the surface of the diaphragm 11 against the surface of the seat, the magnitude of the bias pressure can be $(0.02 - 0.1)P_s$ which gives the appropriate switching characteristic of a flip-flop gate having four inputs.

Figure 27:
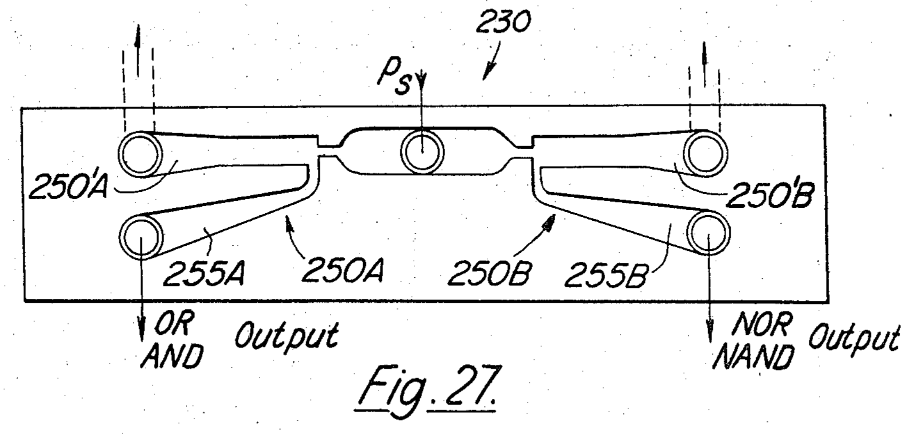
FIG. 27 shows a non-vented planar ejector element suitable for use in the gates shown in FIGS. 24, 25 and 26.

In the three examples shown in FIGS. 24, 25 and 26, the PE outputs may be replaced by a pair 250A, 250B of the type 250 shown in FIG. 27 which is a non-vented type. The pair are formed as an integral element, generally indicated at 230, in which the respective supply and output channels are indicated by the reference numerals 250'A, 255A, and 250'B and 255B. The element 230 functions the same way as the vented element to provide OR-NOR or AND-NAND outputs or a double flip-flop output, one having positive pressure and the other negative pressure according to the diaphragm gate employed.

The Second,Hybrid, System: The second, hybrid, system is based upon the coupling of the monostable wall attachment amplifier - MWAA 160 with the single path diaphragm element 1.

Figure 28:
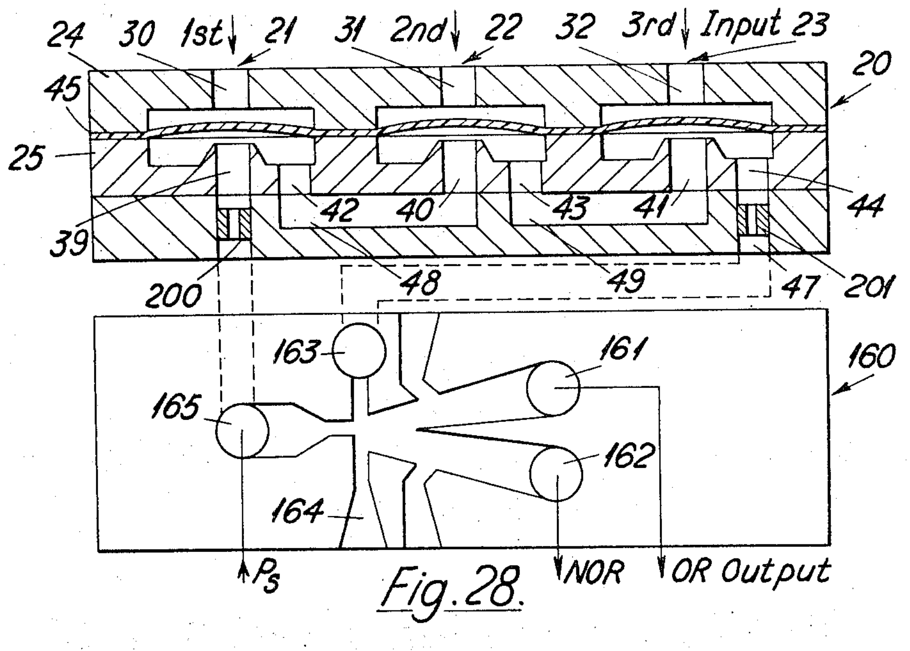
FIG. 28 shows a 3-input OR-NOR gate according to the present invention.

A first embodiment of the hybrid system is a three input OR-NOR hybrid gate which can be seen in FIG. 28. The series interconnection of the SPDE's 21, 22 and 23 is supplied through the supply restrictor 200 into the supply channel 39 of the first SPDE 21. The vent channel of the last SPDE 23 in line is connected through vent restrictor 201 to the input 163 of the MWAA 160. If no input signal on the SPDE series 20 is applied, the OR output is at a low-level and the NOR output at the high-level. But, if any of the three inputs is applied, the flow through the SPDE series 20 is stopped and the stream in the MWAA 160 switches to the wall of its monostable position, producing the high-level OR,output signal at output 161 and the low-level, NOR, output signal at output 162.

Figure 29:
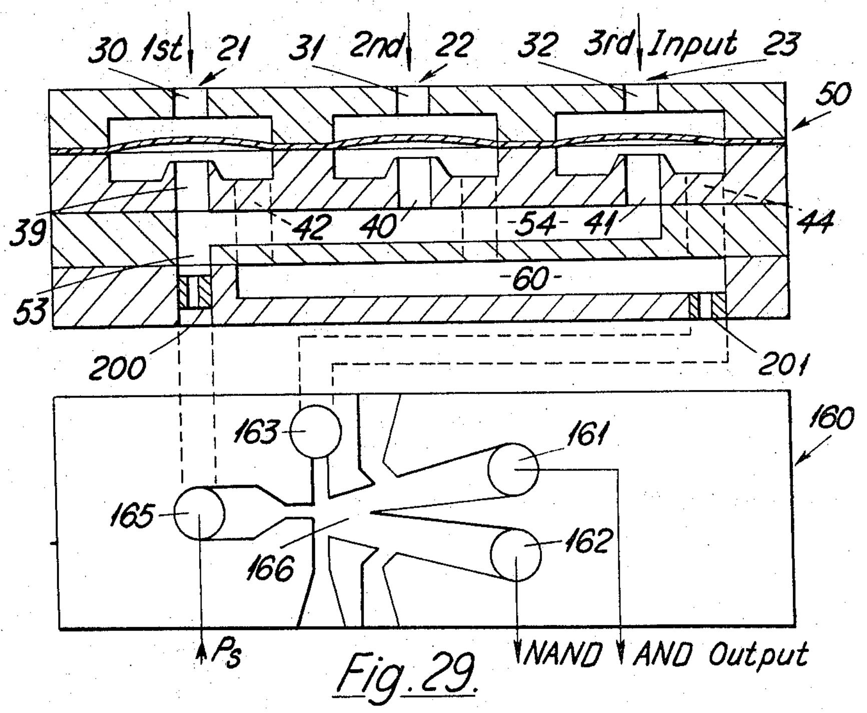
FIG. 29 shows a 3-input AND-NAND gate according to the present invention.

A second embodiment consits of a three input AND-NAND hybrid gate can be seen in FIG. 29. The common supply channel 54 of the SPDE's 21, 22 and 23 is supplied through the supply restrictor 200 into the three SPDE supply channels 39, 41, 41 and the common output 60 is connected through the outlet restrictor 201 to the input 163 of the MWAA 160. All of the three input signals must be applied to stop the flow keeping the stream in the MWAA 160 in the output 162, thus causing the switching of the stream into the AND output 161, instigating the AND and NAND output signals of the MWAA.

Figure 30:
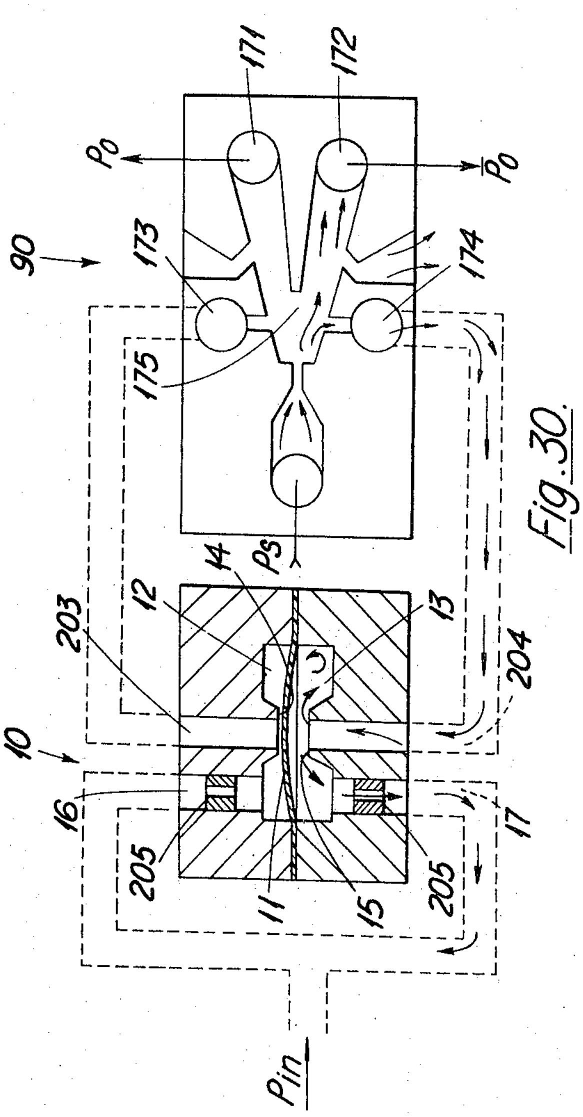
FIG. 30 shows a single input memory gate according to the present invention.

A further hybrid system, using a DPDE unit 10 can be seen in FIG. 30. It consists of a "memory" gate. The coupling of the double path diaphragm element 10 with the bistable wall attachment amplifier 90 creates a bistable memory gate with one input $P_{in}$. The two inputs 173, 174 of the BWAA 90 are connected to the supply channels 203, 204 of the DPDE 10 while the one input $P_{in}$ is divided to both DPDE outlet channels 17, 18 containing the outlet restrictors 205. When the high-level output is $P_o$ channel the higher pressure in the input channel 174 keeps the diaphragm 11 on the upper seat 14, thereby closing the upper path 12 in te DPDE 10. If the input signal $P_{in}$ is applied, the flow can pass through the open path 13 in the DPDE 10 to the input channel 174. The stream in BWAA 90 is thereby switched into the $P_o$ output channel 171 and remains in this position due to wall attachment effect. Whilst the input remains, the diaphragm 11 does not change its position but stays closing the upper seat 14. However when the input signal ceases, the higher pressure in the input channel 173 switches the diaphragm 11 onto the bottom seat 15. Thus the gate is prepared for the next input signal, and the dividing of the input signal frequency is obtained.

Figure 31:
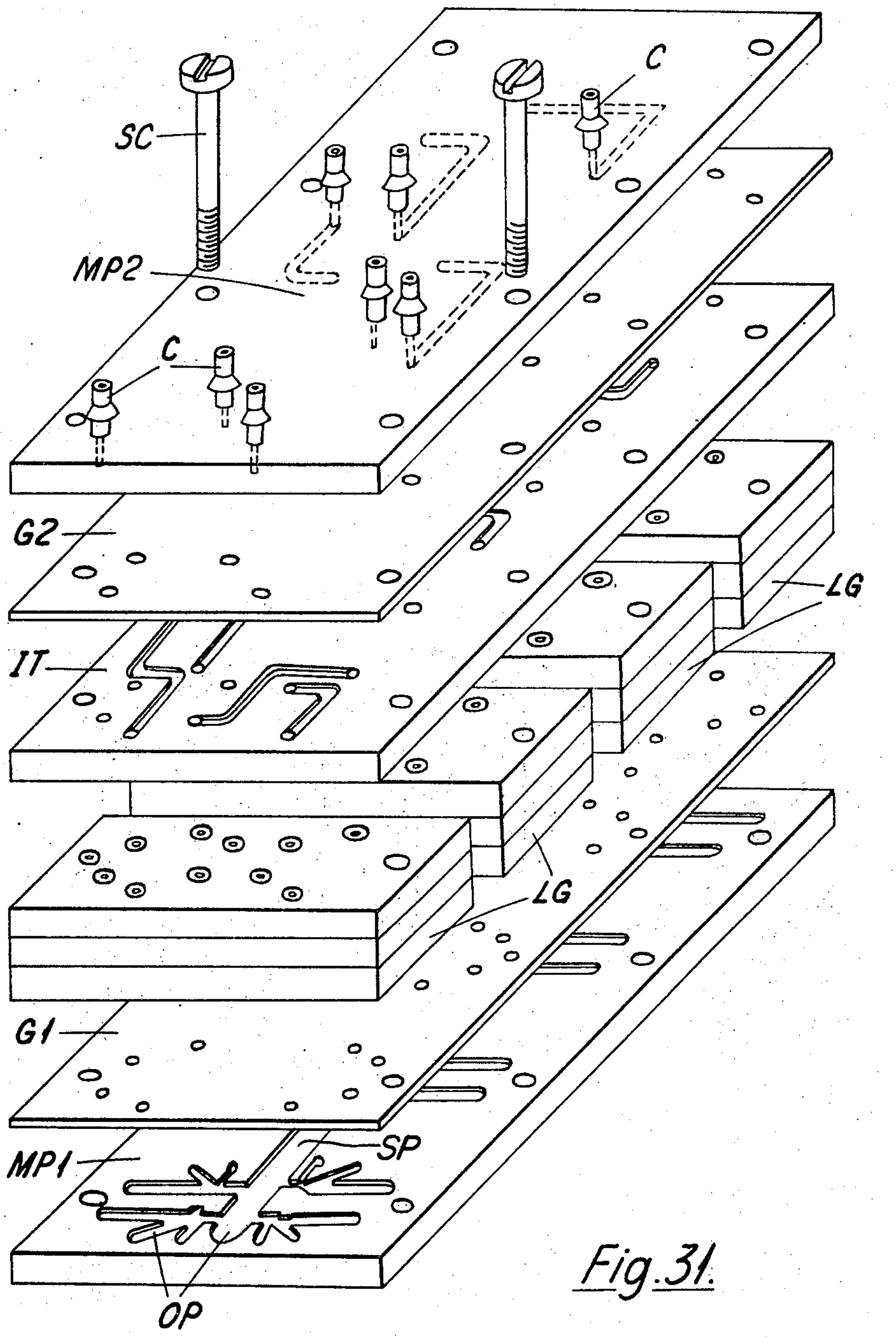
FIG. 31 is a perspective exploded view of a modular assembly of logic gates according to the embodiment of FIGS. 24 to 26 or 28 to 30.

In FIG. 31, a modular assembly of logic gates LG according to FIGS. 24, 25, 26, 27, 28, 29 or 30 is shown. The individual gate input stages are formed from plate laminations as above described, and are clamped between manifold plates MP1, MP2. The former has the output devices OP formed therein and comprises a supply inlet (not shown) feeding a common supply channel SP for all the gates; plate MP2 having bores and channels formed therein for signal connectors C. Interposed between the input stages and each of the plates MP1 and MP2 is a gasket G1, G2; and interposed between the gasket G2 and the input stages is a plat IT having suitable interconnecting channels for the input stages, formed therein. The whole is clamped together by screws SC to form a compact assembly.

What we claim is:

1. A double function, fluid logic device comprising an input stage connected to receive a fluid input representing a logic function and an output stage connected to the input stage to provide an output in response to application to the input stage of said fluid input;

wherein the output stage comprises a fluid amplifier system having:

a first output channel, a second output channel, means for connecting the channels to a supply of operating fluid under pressure and means for deriving a fluid stream from said fluid under pressure applied thereto, the input stage being connected to the amplifier system to obtain said stream of fluid from fluid supplied to the amplifier system, said input stage being connected to said amplifier system in a manner such that the pressure of said fluid input to the input stage is always opposed to the pressure in the input stage presented by said fluid stream whereby when said fluid input is applied to the input stage, a condition is set up in the amplifier system in which fluid is diverted into said first output channel to provide a high-pressure (Po) signal therein while fluid is prevented from passing into said second output channel to provide a low-pressure ($\bar{P}$) signal therein; and wherein said input stage comprises a diaphragm element system to provide a switching action consequential to the application to the input stage of said fluid input; said diaphragm element system having a diaphragm positioned to the biased to at least one stable position under the pressure of said fluid stream from the output stage of said device and capable of being switched between its stable positions by pressure changes induced in the device by the application of said fluid input to the input stage of the device.

2. A modification of the logic gate according to claim 1, comprising a flip-flop gate, wherein one double path DE switch is employed as the input stage of the gate, the double path DE switch having each vent chamber connected to at least one input signal orifice; and wherein two PE (planar ejector) devices, each providing one of said output channels, are employed as the output stage of the gate, and each of the two PE devices has its supply channel connected to the input orifice of a respective one of the vent chambers of the double path DE switch so that whenever an input signal or signals as the case may be, is or are applied to one of the vent chambers of the double path DE switch to cause the diaphragm thereof to switch, the PE device connected to the other vent chamber is caused to switch from the supply channel to the output channel thereof to provide the Po output signal while the PE device connected to said one vent chamber is caused to switch from the output channel to the supply channel thereof to provide the $\bar{P}$ signal in the output channel thereof.

3. A logic gate according to claim 1, wherein one double path DE switch is employed as the input stage of the gate, and the output stage of the gate is constituted by a BWA (bistable wall attachment effect) amplifier the positive and negative out-put channels of which constitute said output channels of the output stage; said positive and negative output channels being connected respectively to the input orifices of the vent chambers of the double path DE switch, and the vent orifices of the vent chambers of the double path DE switch being connected to a common signal input, so that an input signal fed to the common input is applied on both sides of the diaphragm of the double path DE switch and generates a back pressure in one or the other of the vent chambers of the latter depending on the position of the diaphragm thereof, to cause switching of the BWA amplifier to provide the Po signal in the positive channel thereof and the $\bar{P}$ signal in the negative channel thereof and, so that consequentially on cessation of the input signal, the diaphragm of the double path DE switch is switched over to leave the switch in a condition in which the next following input signal fed to the common input again causes switching of the BWA amplifier and of the diaphragm of the double path DE switch.

4. A double function fluid logic gate according to claim 1, wherein a plurality of SPDE (single path diaphragm element) switches are interconnected to form the input stage of the gate.

5. An assembly of a plurality of logic gates according to claim 4, the assembly comprising a first manifold plate having the output stage of the gate formed therein and comprising a supply channel for supplying air at a steady pressure to the output stage, a second manifold plate formed with connections for the signal inputs and outputs of the gates and a set of plate laminations for each logic gate or a set of each logic gate, in which the DE switches of the gate or set thereof are formed; the sets of plate laminations being clamped between the two manifold plates.

6. An assembly of a plurality of logic gates according to claim 4, comprising a common manifold plate for the gates; the manifold plate having formed therein the passageways for the output system and for the signal inputs and signal outputs of each gate so that all external connections to the gates are formed at the exterior side of the manifold plate.

7. A logic gate according to claim 1, wherein each of said output channels is provided in a separate amplifier device.

8. A logic gate according to claim 7, wherein each of said output devices consists of a cylindrical ejector.

9. A logic gate according to claim 8, wherein a first ejector is used to supply the input stage of the gate with air at a steady pressure; and wherein a second ejector is operated by a DPDE (double path diaphragm element) switch one input orifice of which is connected to the air supply exhaust of the input stage, and the other input orifice of which is connected to the air-supply receiving channel of the second ejector whereby when the input stage of the gate ceases to pass the air supply from the first ejector, the air supply to that ejector is injected into the output channel thereof to provide the Po signal while the air supply to the second ejector is vented through the DPDE switch to cause air to be ejected from the output channel of the second ejector to provide the $\bar{P}$ signal.

10. An OR/NOR logic gate according to claim 9, wherein the SPDE switches of the input stage of the gate are serially connected so that when an input signal is applied to any one of the switches, the input stage of the gate ceases to pass the air supply from the first ejector.

11. An AND/NAND logic gate according to claim 9, wherein the SPDE switches of the input stage are connected in parallel so that when an input signal is applied to all of the switches, the input stage of the gate ceases to pass the air supply.

12. A logic gate according to claim 7, wherein each of said output devices comprises a PE (planar ejector) device.

13. An OR/NOR logic gate according to claim 12, wherein the SPDE switches are serially connected; and wherein the input orifice of the vent chamber of the first switch in the series is connected to the supply channel of a first of the PE devices, and the vent orifice of the vent chamber of the last in the series is connected to one of the vent chambers of a double path DE switch the input orifice of the other vent chamber of which is connected to the supply channel of a second of the PE devices, so that when an input signal is applied to any of the SPDE switches of the series, the first PE device is switched from the supply channel to the output channel thereof to provide the OR (Po signal) output of the gate while the second PE device is switched from the output channel to the supply channel thereof to provide in the output channel the NOR ($\bar{P}$ signal) output of the gate.

14. An AND/NAND logic gate according to claim 12, wherein the SPDE switches are connected in parallel; and wherein the input orifice of the vent chamber of each of the switches is connected to the supply channel of a first of the PE devices, and the vent orifice of the vent chamber of each of the switches is connected to the input orifice of one of the vent chambers of a double path DE device, the input orifice of the other vent chamber of which is connected to the supply channel of a second of the PE devices, so that when an input signal is applied to each of the SPDE switches, the first PE device is switched from the supply channel to the output channel thereof to provide the AND (Po signal) output of the gate while the second PE device is switched from the output channel to the supply channel thereof, to provide in the output channel, the NAND ($\bar{P}$ signal) output of the gate.

15. A logic gate according to claim 12, wherein the PE devices have a common supply and are formed together in a unit structure.

16. A logic gate according to claim 12, wherein each of the PE devices comprises a vented output channel.

17. A logic gate according to claim 12, wherein each of the PE devices comprises a non-vented output channel.

18. A logic gate according to claim 1, wherein the two outputs are constituted by a system consisting of a MWA (monostable wall attachment) amplifier the positive and negative output channels of which constitute said output channels.

19. An OR/NOR logic gate according to claim 18, wherein the plurality of SPDE switches are connected in series with the input orifice of the vent chamber of the first SPDE switch in the series being connected to the supply orifice of the MWA amplifier, and the vent orifice of the vent chamber of the last SPDE switch in the series being connected to the signal input orifice of the MWA amplifier so that the application of an input signal to any of the SPDE switches, results in switching of the MWA amplifier from the negative channel to the positive channel thereof to provide the OR (Po signal) output of the gate in the positive channel and the NOR ($\bar{P}$ signal) output of the gate in the negative channel.

20. An AND/NAND logic gate according to claim 18, wherein the plurality of SPDE switches are connected in parallel with the input orifice of the vent chamber of each SPDE switch being connected to the signal input orifice of the MWA amplifier and the vent orifice of the vent chamber of each SPDE switch being connected to the supply channel orifice of the MWA amplifier so that the application of an input signal to all of the SPDE switches results in the switching of the MWA amplifier from the negative channel to the positive channel thereof to provide the AND (Po signal) output of the gate in the positive channel and the NAND ($\bar{P}$ signal) output of the gate in the negative channel.

* * * * *